(12) United States Patent
Wong (10) Patent No.: US 8,769,341 B2
(45) Date of Patent: Jul. 1, 2014

(54) SYSTEM AND METHOD FOR TRANSMITTING DATA USING INCREMENTAL REMEDIATION

(75) Inventor: Marcus Wong, Green Brook, NJ (US)

(73) Assignee: FutureWei Technologies, Inc., Plano, TX (US)

(*) Notice: Subject to any disclaimer, the term of this patent is extended or adjusted under 35 U.S.C. 154(b) by 338 days.

(21) Appl. No.: 13/217,071

(22) Filed: Aug. 24, 2011

(65) Prior Publication Data

US 2012/0054535 A1  Mar. 1, 2012

Related U.S. Application Data (60) Provisional application No. 61/377,279, filed on Aug. 26, 2010.

(51) Int. Cl.
*G06F 11/00* (2006.01)

(52) U.S. Cl.
USPC ............................ 714/38.1; 714/4.3; 717/171

(58) Field of Classification Search
USPC ................. 714/3, 4.3, 38.1; 717/171
See application file for complete search history.

(56) References Cited

U.S. PATENT DOCUMENTS

| | | | |
|---|---|---|---|
| 5,155,847 A * | 10/1992 | Kirouac et al. | 709/221 |
| 5,790,856 A * | 8/1998 | Lillich | 717/163 |
| 6,986,133 B2 * | 1/2006 | O'Brien et al. | 717/173 |
| 7,516,367 B1 * | 4/2009 | Beltowski et al. | 714/38.1 |
| 2002/0075824 A1 * | 6/2002 | Willekes et al. | 370/329 |
| 2007/0050678 A1 * | 3/2007 | Estes et al. | 714/38 |
| 2009/0061924 A1 * | 3/2009 | Morrill et al. | 455/552.1 |
| 2009/0119655 A1 * | 5/2009 | Quilty | 717/168 |
| 2009/0279430 A1 | 11/2009 | Huber et al. | |
| 2010/0111013 A1 | 5/2010 | Chou | |
| 2010/0130171 A1 | 5/2010 | Palanigounder et al. | |

OTHER PUBLICATIONS

"3GPP TS 32.593, V9.0.0, Technical Specification, Procedure Flows for Type 1 Interface HeNB to HeNB Management System, (Release 9)" 3rd Generation Partnership Project, Technical Specification Group Services and System Aspects; Telecommunication Management; Home eNode B (HeNB) Operations, Administration, Maintenance and Provisioning (OAM&P), Dec. 2009, pp. 1-19.

"3GPP TS 32.594, V9.1.0, Technical Specification, XML Definitions for Type 1 Interface HeNB to HeNB Management System (HeMS), (Release 9)" 3rd Generation Partnership Project, Technical Specification Group Services and System Aspects; Telecommunication Management; Home Enhanced Node B (HeNB) Operations, Administration, Maintenance and Provisioning (OAM&P), Sep. 2009, pp. 1-14.

(Continued)

*Primary Examiner* — Philip Guyton
(74) *Attorney, Agent, or Firm* — Slater & Matsil, L.L.P.

(57) ABSTRACT

A system and method for recovering from a failure is disclosed. A preferred embodiment comprises downloading a first patch into a base station, installing the first patch, loading the first patch, and validating the first patch. Once the first patch has been validated, a second patch may be downloaded, installed, loaded, and verified. This incremental remediation approach allows for the conservation of resources if the system is non-recoverable, as this will become evident prior to a complete download and install is performed.

27 Claims, 6 Drawing Sheets

(56) References Cited

OTHER PUBLICATIONS

"3GPP TS 33.320, V9.2.1, Technical Specification, Security of Home Node B (HNB)/Home Evolved Node B (HeNB), Release 9" 3rd Generation Partnership Project, Technical Specification Group Services and System Aspects, Jun. 2010, pp. 1-33.

"TR-069 CPE WAN Management Protocol v1.1," The Broadband Forum, Issue 1, Amendment 2, Dec. 2007, pp. 1-138.

Beth et al., "Valuation of Trust in Open Networks," Proceedings of the European Symposium on Research in Computer Security, ESORICS '94, Brighton, UK, 1994, pp. 3-18.

Blaze et al., "Decentralized Trust Management," Proceedings of the 1996 IEEE Symposium on Security and Privacy, SP '96, Oakland, California, May 1996, pp. 164-173.

Marsh, "Formalising Trust as a Computational Concept," Department of Computing Science and Mathematics, University of Stirling, Apr. 1994, 184 pages.

Miller et al., "Development of Metrics for Trust in Automation," 15th ICCRTS—The Evolution of C2, Jun. 2010, 19 pages.

Morrow et al., "Metrics for Trust in Layered Sensing," IEEE, International Symposium on Collaborative Technologies and Systems, May 2010, pp. 386-389.

Yahalom et al., "Trust Relationships in Secure Systems—A Distributed Authentication Perspective," IEEE Proceedings of the 1993 IEEE Symposium on Security and Privacy, SP '93, Oakland, California, May 1993, pp. 150-164.

\* cited by examiner

SYSTEM AND METHOD FOR TRANSMITTING DATA USING INCREMENTAL REMEDIATION

This application claims the benefit of U.S. Provisional Patent Application Ser. No. 61/377,279, filed on Aug. 26, 2010, and entitled "Incremental Remediation," which application is incorporated herein by reference.

TECHNICAL FIELD

The present invention relates generally to a system and method for transmitting data and, more particularly, to a system and method for remediating a base station that has suffered a failure.

BACKGROUND

An Access Point in Femto located in a customer's premise may have increased security threats and risks compared to traditional operator equipment, such as physical location, nature of attacks, etc. As such, additional security features and requirements may be placed on these types of equipment, such as performing a platform integrity validation before the access point is allowed to connect to the operator's core network, to start using licensed spectrum, or to provide service to end users. When the platform integrity validation fails, it may be due, e.g., to hardware failure, software failure, or configuration data modification which may be either malicious or accidental in nature. Most failures, except hardware failure, can be recovered through a process called remediation where failed components are replaced through patch or software download from a trusted OAM source. The process of software or patch download that is used primarily for software update may be found in 3GPP standards using BBF's TR-069 mechanism.

However, this current mechanism is used during normal operations of the system, and is not suitable in case of extraordinary events, such as a platform integrity validation failure due to software and/or configuration component failure or modification. Platform integrity validation is the process of checking the integrity, which is a cryptographic hash or cryptographic checksum of component in either binary or ASCII format, of a particular component (e.g. software module, configuration file, etc.) of a platform against a stored reference value. The stored reference value of a component has been previous verified based on successful validation and is stored securely. Without such a recovery procedure for recovery from extraordinary events, the customer premise equipment has to be taken down and brought to operator service center for correction or through local updates/repairs by customer or repair personnel. Additionally, there may be no manner in which to re-download, re-install, re-validate individual components when multiple components fail. Either of the existing technologies make it difficult to recover from a massive recoverable event gracefully and autonomously, and are too cumbersome, require manual intervention, or puts user out of commission for extended period of time.

SUMMARY OF THE INVENTION

These and other problems are generally solved or circumvented, and technical advantages are generally achieved, by preferred embodiments of the present invention which describe system and methods for an incremental recovery from extraordinary failures.

In accordance with an embodiment, a method for remediating a base station comprising implementing a first patch into the base station that has experienced a failure is provided. A second patch is implemented into the base station if the first patch is successful, the second patch being different from the first patch.

In accordance with another embodiment, a method of automatically recovering from a failure comprising implementing a first patch in a base station is provided. The implementing the first patch comprises receiving the first patch, validating the first patch, and installing the first patch into a first component of the base station. A second patch is implemented in the base station after the implementing the first patch in the base station, and the implementing the second patch comprises receiving the second patch, validating the second patch, and installing the second patch into a second component of the base station different from the first component.

In accordance with yet another embodiment, a method for failure recovery comprising receiving a first download at a wireless base station and installing the first download into the wireless base station is provided. The first download is loaded into the wireless base station and loading the first download is validated. A second download is received at the wireless base station if the validating the loading the first download indicates a successful loading, and the second download is installed at the wireless base station.

In accordance with yet another embodiment, a method of transmitting remediation data comprising transmitting a first patch from a transmission station, the first patch being a first subset of a series of patches that are related to each other, is provided. A request for a second patch to be transmitted is received by the transmission station, and the second patch is transmitted from the transmission station, the second patch being a second subset of the series of patches and also being different from the first patch.

In accordance with yet another embodiment, a base station comprising a first implementing unit, the first implementing unit configured to implement a first patch into the base station that has experienced a failure, is provided. A second implementing unit is configured to implement a second patch into the base station if the first patch is successful, the second patch being different from the first patch.

In accordance with yet another embodiment, a base station comprising a receiving unit configured to receive a first download at a base station is provided. An installation unit is configured to install the first download into the base station and a loading unit is configured to load the installed first download into the base station. A load validation unit is configured to validate the load of the installed first download, wherein the receiving unit is also configured to receive a second download at the base station if the load validation unit indicates a successful loading, and wherein the installation unit is also configured to install the second download at the base station.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a remediation process for wireless nodes. The invention may also be applied, however, to other remediation processes and recovery of validation failure events.

Figure 1:
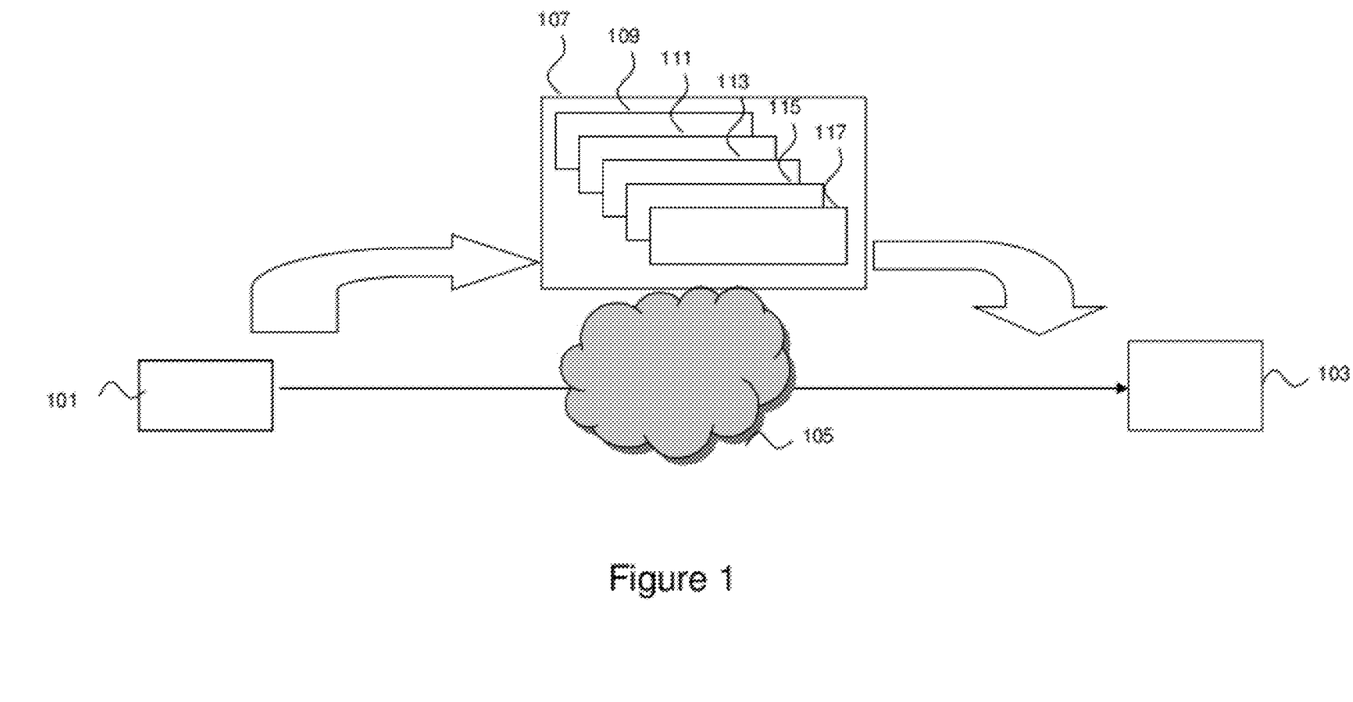
FIG. 1 illustrates a communication channel between an transmission system and a base station in accordance with an embodiment of the present invention.

With reference now to FIG. 1, there is a transfer of remediation information from a transmission station 101 to, e.g., a base station 103 over a network 105. The transmission station 101 may be any suitable device that can be used to transmit the remediation information to the base station 103. In an embodiment the transmission station 101 may be an Operations, Administration, and Maintenance (OAM) system, which may provide maintenance and management functions for the base station 103 over the network 105. The OAM system may provide such capabilities as device remediation, device configuration, device management, data management, server maintenance, performance statistics, alarm management, service tracing, security management, troubleshooting, environment and power supply monitoring, combinations of these, and the like.

However, as one of ordinary skill in the art will recognize, the transmission station 101 is not intended to be limited to an OAM system. Alternatively, any other suitable transmitter of remediation or upgrading information, such as a factory or vendor software site or even an over-the-air transmission of information across television frequencies, may also be utilized. These transmission systems and any other suitable transmitters of remediation or other information are fully intended to be included within the scope of the present embodiments.

The base station 103 may be a device that is connected to the network 105 and which may receive information from the transmission system 101 over the network 105. In an embodiment the base station 103 may be a Femto access point which may connect an access terminal (not separately shown in FIG. 1) to the network 105 through either wired or wireless means. However, as one of ordinary skill in the art will recognize, examples of suitable base stations are not limited to Femto access points and may include wireless routers, wireless local area network (WLAN) access points, wireless wide area networks (WWAN) access points, worldwide interoperability for microwave access (WiMAX) base stations, Node B (NB), base transceiver station (BTS) a home Node B (home NodeB, Home Node B, HNB) a home-evolved eNode B (HeNB), and the like. Additionally, any other suitable network access point device (such as cable modem boxes or wired routers), any other suitable end user device (such as home computers, telephones, or television sets), any other suitable device that has an internet protocol address and utilizes platform validation, or any other devices that may connect to the network 105 and which may receive information from the transmission system 101, may alternatively be utilized.

Figure 2:
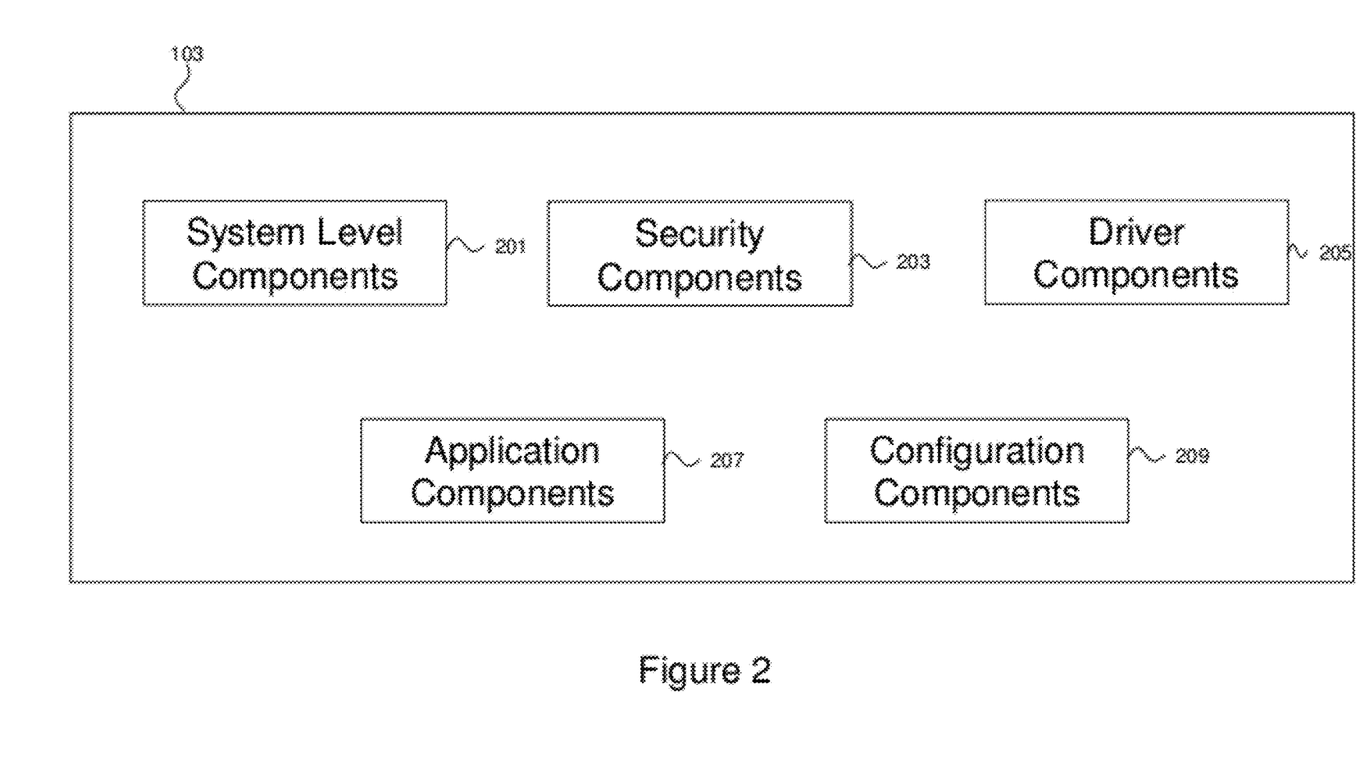
FIG. 2 illustrates components within a base station in accordance with an embodiment of the present invention.

FIG. 2 illustrates a number of illustrative components that may be included within the base station 103 in an embodiment in which the base station 103 is a Femto access point. In this embodiment, the base station 103 may comprise components such as system level components 201, security components 203, driver components 205, application components 207, and configuration components 209. The system level components 201 may be, e.g., firmware components, BIOS components, operating system components, combinations of these, and the like, while the security components 203 may comprise components such as encryption components and authentication components that allow the base station 103 to communicate and operate securely.

Additionally, the driver components 205 may be utilized to allow the hardware of the base station 103 to communicate with software, and the application components 207 may be utilized to run communication programs, monitor the base station 103 for alarm situations, generate reports, or the like. Finally, the configuration components 209 may be utilized to configure the base station 103, such as by configuring the base station's 103 location, radio frequency channels, neighbor lists, combinations of these, and the like.

However, as one of ordinary skill in the art will recognize, the components listed above with respect to the base station 103 are intended to be illustrative examples and are not intended to limit the scope of the embodiments. Any number of additional components, such as a network communication component, a flow management component, a communication platform component, or the like, may additionally or alternatively be included within the base station 103. These components and any other components may be included within the base station 103 and are fully intended to be included within the scope of the embodiments.

Returning now to FIG. 1, the network 105 may be a wired or wireless network that allows the transmission system 101 to communicate and send data to the base station 103. In an embodiment, the network 105 may be an insecure internet protocol (IP) network comprising an internet type network. Additionally, the network 105 may comply with standards such as the WiMAX standard, the Third Generation Partnership Project Long Term Evolution (3GPP LTE) standard, or the 3GPP2 Air Interface Evolution (3GGP2 AIE) standard. However, any other suitable network, such as a cellular network (e.g., utilizing blockcast broadcast or unicast transmissions), a cable network, or even an over-the-air television transmission network, that allows the transmission system 101 to communicate and send data to the base station 103 may alternatively be utilized.

During operation, the base station 103 may desire a patch for a desired upgrade or else the base station 103 may suffer a failure that prevents its normal functioning and its own self-recovery. One such failure may be a platform integrity validation failure, in which the base station 103 may attempt to perform a validation before it connects to the transmission system 101. Such a validation failure may be a soft failure, in which a piece of the system level components 201 (see FIG. 2) fails, the driver components 205 fail, the configuration components 209 fail, a combination of these components fail, or the like. Alternatively, the validation failure may be a hard failure, in which a piece of hardware has been modified, the physical memory fails, the case is opened, or the like.

These failures may occur, e.g., accidentally if there is a corruption of an application component 207 (See FIG. 2), if a component is loaded incorrectly, or the like. These failures may also occur maliciously through an active or passive attack, which may lead to security beaches. When such failures occur, these failures need to be addressed in order for the base station 103 to resume normal operation in a safe and also an efficient manner.

In order to address such a failure and get the base station 103 to resume normal operation, one or more of the components (e.g., the system level components 201, the security components 203, the driver components 205, the application components 207, and the configuration components 209) may need to be remediated, and in some cases all of the system components may need to be remediated or rebuilt. In an embodiment the transmission system 101 may attempt to remediate the base station 103 by transferring the information and data required to remediate the system components through the network 105. The transfer may be, e.g., a series of patches 107, such as a first patch 109, a second patch 111, a third patch 113, a fourth patch 115, and a fifth patch 117, which may be needed to perform the remediation of the components of the base station 103 that can be remediated by one or more of the series of patches 107 patches. In an embodiment, each one of the series of patches 107 may be related to each other in that each one of the series of patches 107 may comprise a patch of a different component of the same base station 103. For example, the first patch 109 may be a patch of the system level components 201 of the base station 103, the second patch 111 may be a patch of the security components 203 of the base station 103, the third patch 113 may be a patch of the driver components 205 of the base station 103, the fourth patch 115 may be a patch of the application components 207 of the base station 103, and the fifth patch 117 may be a patch of the configuration components 209 of the base station 103.

However, if the entire series of patches 107 is sent to the base station 103 at one time, all of the bandwidth and other resources that would be required to send the entire series of patches 107 would be utilized. However, if the series of patches 107 do not solve the problem, the entire series of patches 107 would need to be again resent to the base station 103, utilizing more resources. Additionally, if only one of the series of patches 107 is needed to solve the failure, the resources utilized in sending all of the series of patches 107 is wasted.

Accordingly, in order to avoid sending a single, large patch that may not work and only result in the wasteful expenditure of resources, in an embodiment the series of patches 107 may be sent in multiple transmissions including either an individual one of the series of patches 107 (e.g., only the first patch 109) or else some subset combination of individual ones of the series of patches 107 (e.g., the first patch 109 and the second patch 111). After each one of the multiple transmissions, the base station 103 may receive/download each of the multiple transmissions, validate, install, and load the individual ones of the series of patches 107 that were sent by the transmission station 101 (as discussed further below with respect to FIG. 3).

Each of the series of patches 107 may comprise program code that may be utilized to fix the failed components of the base station 103. For example, the first patch 109 may comprise information utilized to remediate the system level components 201 (see FIG. 2) within the base station 103, while the second patch 111 may comprise information utilized to remediate the security components 203 of the base station 103. Each one of the series of patches 107 may be, e.g, data driven patches, code driven patches, or a combination of data and code driven patches.

Each one of the series of patches 107 may additionally include a header and signature that may be used to individually validate respective ones of the series of patches 107. For example, the first patch 109 may include a first header and a first signature that may be used to validate the first patch 109, while the second patch 111 may include a second header and a second signature that may be used to validate the second patch 111. These signatures may include a size of the individual one of the series of patches 107 in which it is located, an encrypted hash included within the individual one of the series of patches 107 in which it is located, or a checksum for the individual one of the series of patches 107 in which it is located. These signatures may be utilized to validate each one of the series of patches 107 after each one of the series of patches 107 has been received by the base station 103 (as discussed further below with respect to FIG. 3). However, as one of ordinary skill in the art will recognize, the header and signature as described are intended to be illustrative and are not intended to limiting to the embodiment, as any other suitable header and signature may alternatively be utilized.

Figure 3:
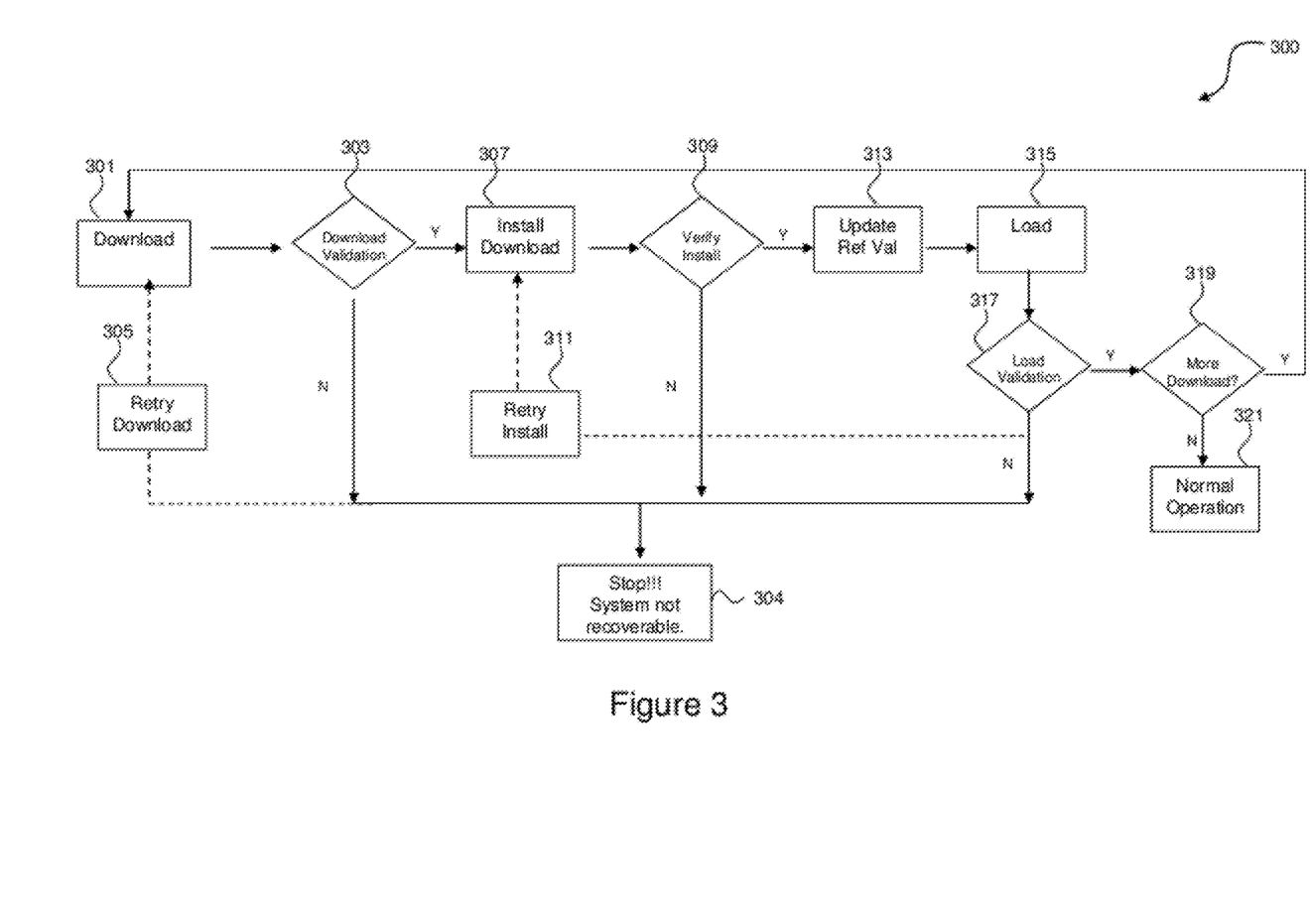
FIG. 3 illustrates a remediation process flow for downloading, installing, and loading a patch in accordance with an embodiment of the present invention.

FIG. 3 illustrates a remediation process 300 by which each one of the series of patches 107 (e.g., the first patch 109) or some subset of the series of patches 107 may be downloaded, installed, and loaded into the base station 103. In an embodiment this process may be implemented automatically without manual intervention or may alternatively be implemented with only limited manual intervention. Using the first patch 109 as an example, the first patch 109 may be transmitted by the transmission system 101 to the base station 103 over the network 105, where the first patch 109 may be downloaded to the base station 103 in a download step 301. During the download step 301 the first patch 109 may be stored, e.g., in either volatile or non-volatile memory for eventual validation and installation.

Once the first patch 109 has been downloaded in the download step 301 to the base station 103, the base station 103 may validate the first patch 109 in a download validation step 303 in order to ensure that there was no problem with the download step 301 or with the first patch 109. In an embodiment the download validation step 303 may be performed utilizing the signature from the first patch 109. For example, in an embodiment in which the signature from the first patch 109 is an encrypted hash, once the first patch 109 has been downloaded to the base station 103 in the download step 301, the base station 103 may take the received first patch 109 (or some desired portion of the received first patch 109) and apply a hashing algorithm to it in order to obtain a hashing result. If the result of the hashing algorithm matches the hash key received with the first patch 109, then the first patch 109 may be validated as not being tampered with or otherwise corrupted during the download step 301. If the result of the hashing algorithm does not match the hash key received with the first patch 109, then the first patch 109 may be rejected and not installed, as it may have been tampered with or otherwise corrupted.

If the download validation step 303 indicates that the download step 301 of the first patch 109 has either failed or the first patch 109 cannot otherwise be positively validated, the transmission system 101 may attempt to retry the download in a retry download step 305 and attempt to resend the first patch 109. Once the second attempt at downloading the first patch 109 has been downloaded by the base station 103, the download validation step 303 may be performed on the retransmitted first patch 109 as described above with reference to the originally transmitted first patch 109. This attempt to resend the first patch 109 until the first patch 109 has been validated may be repeated until the base station 103 has successfully downloaded and validated the first patch 109 from the transmission system 101. The base station 103 may then proceed to an installation of the first patch 109.

However, it should be noted that, if the download validation step 303 performed on the first patch 109 is never successful, as may occur if there is something wrong with the first patch 109 itself and not the download step 301, the transmission system 101 may enter into an infinite loop in which it is continuously attempting to send the first patch 109 to the base station 103, which will never validate the received first patch 109. In order to prevent this from occurring, the number of times in which the transmission system 101 may attempt to retry sending the first patch 109 may be limited to a finite number of times, after which the transmission system 101 will stop attempting to resend the first patch 109 and save any further use of resources. In an embodiment, the finite number of times may be limited to, for example, three (3) retries, although any suitable number of retries may alternatively be chosen.

If the attempt to retry the download step 301 of the first patch 109 is unsuccessful (for example after three retries), then the base station 103 may not be recoverable by the transmission station 101 without direct human intervention. As such, if the retries of the download step 301 to download the first patch 109 is halted, the entire remediation process may also be stopped in a stop step 304. By stopping the remediation process at this point, instead of after a download of every single one of the series of patches 107, system resources may be conserved, leading to an overall more efficient use of available resources. Additionally, by discovering the seriousness of the problem quickly, additional resources, if desired, may be brought to bear to fix the base station 103 quicker than a more extended download process would allow.

Optionally, if the first patch 109 is downloaded in the download step 301 and fails the download validation step 303, the base station 103 may store the original first patch 109 in memory, such as a cache memory. Once the downloaded first patch 109 has been stored, another first patch 109 may be downloaded in the retry download step 305 and then compared to the original first patch 109 in storage. If the original first patch 109 and the next first patch 109 match each other, this is an indication with high probability that there is not a problem with the download step 301, but rather that there is a problem with the first patch 109 itself (e.g., the first patch 109 may be corrupted). As such, the repetitive downloading may be halted in order to conserve resources even before the finite number of times has been reached.

If download validation step 303 successfully validates the first patch 109 downloaded during the download step 301, the base station 103 may install the first patch 109 into the base station 103 in an install download step 307. The install download step 307 may include such steps as unpacking files (not illustrated in FIG. 3) that were supplied in the first patch 109 in a compressed format and copying the unpacked files to a suitable location within the base station 103 such as secured permanent storage to generate an installed first patch 109. Once the unpacked files are copied into a suitable location, the unpacked files (e.g., software) may be tailored to suit the hardware of the base station 103 and the user's preferences; information about the first patch 109 may be provided to the operating system of the base station 103; and the system registries of the base station 103 may be updated.

After the first patch 109 has been installed in the install download step 307, the installation may be verified in a verify install step 309 in order to ensure that the install download step 307 successfully installed the first patch 109. In an embodiment the verify install step 309 may verify each step taken by the install download step 307, either after each individual step, after the install download step 307 has fully completed, or some other desired point during the install download step 307. For example, the verify install step 309 may ensure that the files of the first patch 109 are decompressed without integrity errors, may ensure that the decompressed files that were copied to secure storage pass an integrity test verification, or may ensure that the system registries of the base station 103 are properly updated during the install download step 307. However, as one of ordinary skill in the art will recognize, the embodiments are not limited to only the illustrative steps that may be taken by the verify install step 309 discussed herein, as any other suitable steps may be utilized to verify that the first patch 109 was properly installed on the base station 103.

If the verify install step 309 indicates that the install download step 307 failed, then the install download step 307 may be retried in a retry install step 311. However, similar to the retry download step 305 discussed above, the base station 103 may enter into an infinite loop of retry install steps 311 and install steps 307 if the first patch 109 cannot be successfully installed in the install download step 307. Accordingly, in order to prevent the base station 103 from entering into the infinite loop, the retry install step 311 may be limited to, e.g., three (3) attempts to install the first patch 109, although any other number of attempts may alternatively be utilized. If, after the verify install step 309 has indicated that the install download step 307 has failed a number of times, it may be determined that the base station 103 is not recoverable without direct human intervention, and the remediation process may be stopped in the stop step 304 in order to prevent the waste of further resources.

If the verify install step 309 indicates that the install download step 307 has successfully installed the first patch 109, the base station 103 may update stored reference values in an update reference values step 313. The stored reference values may be values that can be used to validate the installed first patch 109 during, e.g., a loading of the first patch 109 into the base station 103 (discussed further below). As such, the stored reference values may be, for example, a cryptographic hash or encrypted checksum of the installed first patch 109 which may be used for subsequent validations or other confirmations, e.g., loading of installed first patch 109 or during execution of installed first patch 109. In an embodiment the stored reference values may be either received from the downloaded first patch 109 or else may be computed locally by the base station 103.

Once the stored reference values have been updated in the update reference values step 313, the first patch 109 may be loaded into the base station 103 in a load step 315. The load step 315 may be performed, e.g., through a reboot of the base station 103, in which the base station 103 is restarted and, upon startup, loads the first patch 109 and other code from permanent memory into the current operation of the base station 103. By loading the first patch 109 into the operation of the base station 103, the base station 103 will utilize the installed first patch 109 instead of the corrupted and failed components, returning the components patched by the base station 103 (e.g., the system level components 201 when the first patch 109 is a patch of the system level components 201) to normal operation. However, as one of ordinary skill in the art will recognize, rebooting the base station 103 is not the only method that may be utilized to load the first patch 109 into the operation of the base station 103, and any other suitable method of loading the first patch 109 may alternatively be utilized.

After the first patch 109 has been loaded into the base station 103 in the load step 315, the load of the first patch 109 may be validated in a load validation step 317. In an embodiment the load validation step 317 may be performed by comparing the first patch 109 coming from secured permanent storage with the reference values stored (and which were updated in the update reference values step 313). For example, as the code of the first patch 109 is being loaded from secured permanent storage, sections of the code of the first patch 109 may be processed using, e.g., a cryptographic hash algorithm. The result of this algorithm may then be compared to the cryptographic hash key value stored in the stored reference values to see if they match. If they do match, the load of the first patch 109 may be validated. If the results do not match, the load of the first patch 109 may be stopped, as the load of the first patch 109 has failed.

As illustrated in FIG. 3, the load validation step 317 may be performed after the load step 315 of the first patch 109 has been completed and the first patch 109 has been completed loaded into the base station 103. However, as one of ordinary skill in the art will recognize, this is merely an illustrative example, and is not intended to limit the embodiments. Alternative implementations of the load validation step 317, such as implementing the load validation step 317 concurrently with the load step 315 and validating the code of the first patch 109 as it is being loaded in the load step 315, are fully intended to be included within the scope of the embodiments.

If the load validation step 317 indicates that the first patch 109 failed to load during the load step 315, the retry install step 311 may be utilized and the install download step 307 may be repeated. However, in order to prevent the base station 103 from entering an infinite cycle of retrying the install download step 307, the number of retry install steps 311 may be limited to, e.g., three retry install steps 311, although any other suitable number of retries may alternatively be utilized. After that, the retry install step 311 may be halted in order to conserve resources.

If the retry install step 311 is halted, the load validation step 317 may also attempt the retry download step 305 in order to retry the download step 301 and see if another download of the first patch 109 may solve the failure indicated by the load validation step 317. However, similar to the retry install step 311, in order to prevent the base station from entering an infinite cycle of retrying the download step 301, the number of retry download steps 305 may be limited to, e.g., three retry download steps 305. After the retry download steps 305 have reached the limited number of retries, the process may be stop in the stop step 304 in order to conserve more resources and prevent them from being wasted.

If the load validation step 317 indicates that the first patch 109 was loaded successfully into the base station 103, then the process to download, install, and load the first patch 109 may be completed, and a determination may be made as to whether or not an additional patch is needed in an additional download step 319. In an embodiment the base station 103 may determine if the first patch 109 solved whatever failure had occurred and whether or not the base station 103 is operating normally. The base station 103 may determine this by performing the platform integrity validation test that initially indicated a failure. If the base station 103 is operating normally (e.g., by passing the platform integrity validation test), an additional download is not needed and the base station 103 may return to normal operation in a normal operation step 321.

By returning the base station 103 to normal operation after downloading, installing, and loading only the first patch 109, the remainder of the series of patches 107, such as the second patch 111, the third patch 113, the fourth patch 115, and the fifth patch 117, are not needed and are not downloaded. By bypassing the downloading of the remainder of the series of patches 107, resources from the transmission station 101 and the network 105 may be conserved instead of wasted. As such, a more efficient overall system may be obtained.

However, if the base station 103 determines that the first patch 109 did not return the base station 103 to normal operation, the base station 103 may request another one of the series of patches 107, such as the second patch 111, from the transmission station 101. Once the transmission station 101 transmits the second patch 111, the second patch 111 may enter the remediation process 300 described above with respect to FIG. 3, and may be downloaded, installed, and loaded into the base station 103.

After the second patch 111 has been downloaded, installed, and loaded into the base station 103 (and each step has been validated or verified), the base station 103 may again make a determination as to whether or not normal operation has been obtained in the additional download step 319. If normal operation has been obtained, the base station 103 may return to normal operation in the normal operation step 321, thereby foregoing any further downloads from the transmission station and preventing the unnecessary wasting of resources.

However, if the base station 103 determines that normal operation has not been achieved with the second patch 111, the base station 103 may request another one of the series of patches 107, such as the third patch 113, which may then enter the remediation process described in FIG. 3. This process may be repeated with each of the individual ones of the series of patches 107 until the base station 103 determines that it has achieved normal operation, and may continue until each one of the series of patches 107 has been downloaded, installed, and loaded into the base station 103.

However, by performing the downloading, installing, and loading incrementally for each one of the series of patches 107, a divide and conquer strategy may implemented whereby each one of the series of patches 107 is individually evaluated as successfully loaded before the next patch utilizes resources to be sent from the transmission system 101 to the base station 103. If for any reason the individual ones of the series of patches 107 cannot be downloaded, installed, or loaded, the individual ones of the series of patches 107 may be either re-downloaded or re-installed, or else the process may be stopped before more resources are wasted. By using such as incremental remediation, if it is not possible to recover from the failure, and the base station 103 is unrecoverable without direct human intervention, such a non-recoverable failure may be detected early in the remediation of the base station 103 and resources may be conserved by not spending them on further fruitless processes or downloads.

Additionally, the order in which the individual ones of the series of patches 107 are transmitted to the base station may be prioritized based on the severity level of the failure, such that the individual ones of the series of patches 107 that are needed to rebuild the components are prioritized in order to increase the probability of a successful recovery. For example, the first patch 109 to be transferred may be a system level patch in order to address issues relating to the system level components 201 such as any firmware, BIOS, or operating system issues that may prevent the next one of the series of patches 107, such as the second patch 111, from successfully being implemented. Once the first patch 109 has been installed and validated, other prioritized patches (in an illustrative order of priority), such as security related patches, driver patches, application patches, and configuration patches, may be individually transferred in order to rebuild and remediate the security components 203, the driver components 205, the application components 207, and the configuration components 209, respectively.

Optionally, the base station 103 may be assigned a trust level that may vary during the remediation of the base station 103. For example, when the base station 103 is operating normally (e.g., prior to the base station 103 having a failure), the base station 103 may be completely trusted, and no restrictions, such as bandwidth restrictions or access restrictions, are placed on the base station 103. However, when the base station 103 has a failure, the transmission system 101 may reduce the trust level of the base station 103 and place restrictions upon the base station 103 in order to ensure that the cause of failure (whether accidental or malicious) of the base station 103 does not spread through the network 105.

The trust level may be, for example, a ranking of trust wherein a lower trust level ranking indicates a low level of trust and a higher trust level ranking indicates a higher level of trust. In an embodiment the trust level may be a ranking beginning from, e.g., zero (indicating the base station 103 is not trusted at all) to one hundred (indicating the base station 103 is in normal operation and is completely trusted). However, such a ranking is merely illustrative, as any suitable ranking of trust levels, such as a ranking from −1 to 1, with −1 being untrusted and 1 being trusted, may alternatively be utilized and are fully intended to be included within the scope of the embodiments.

In an embodiment the base station 103 may be assigned a trust level ranking based upon the number of components (e.g., the system level components 201, the security components 203, etc.) that have been successfully loaded into the base station 103. For example, if the base station 103 has a total failure, its trust level ranking may be set to zero and its interactions with the network 105 and the transmission system 101 may be limited, such as by limiting its bandwidth. In other words, the base station 103 may have a minimal trusted zone with a hardware-based root of trust (which is assumed to be undefeatable). As each component or some combination of components is successfully downloaded, installed, verified and loaded into the base station 103, the trust level ranking may be increased by one for each component or combination of components successfully loaded, and, with the increased trust level ranking, the base station's 103 trusted zone or boundary may be expanded. After reaching a predefined threshold (such as a trust level ranking of fifty in an embodiment using a scale from zero to one hundred), the restrictions on the base station 103 may be eased, and a larger bandwidth may be provided to the base station 103. Additionally, as each of the other components get downloaded, installed, loaded, and verified, the trust level ranking of the base station 103 may again be raised and the zone of trust expanded until the base station 103 resumes normal operation and reaches a fully trusted state, whereby all such safety restrictions are removed from the base station 103 so that the base station 103 may return to fully normal operation.

By utilizing a varying trust level ranking, the base station 103 may initially be restricted in its operation until security measures, such as the security components 203 have been loaded and verified. However, by incrementally increasing the trust level rankings as the base station 103 is incrementally remediated, the receiving of the later ones of the series of patches 107 (such as the third patch 113, the fourth patch 115, and the fifth patch 117) may be downloaded quicker and more reliably, e.g., via a wider bandwidth, once the base station 103 may be trusted. As such, the restrictions placed upon the base station 103 when it is not trusted may be removed as soon as possible, and the overall process may be sped up while still maintaining security control over the base station 103 during the remediation process.

Figure 4:
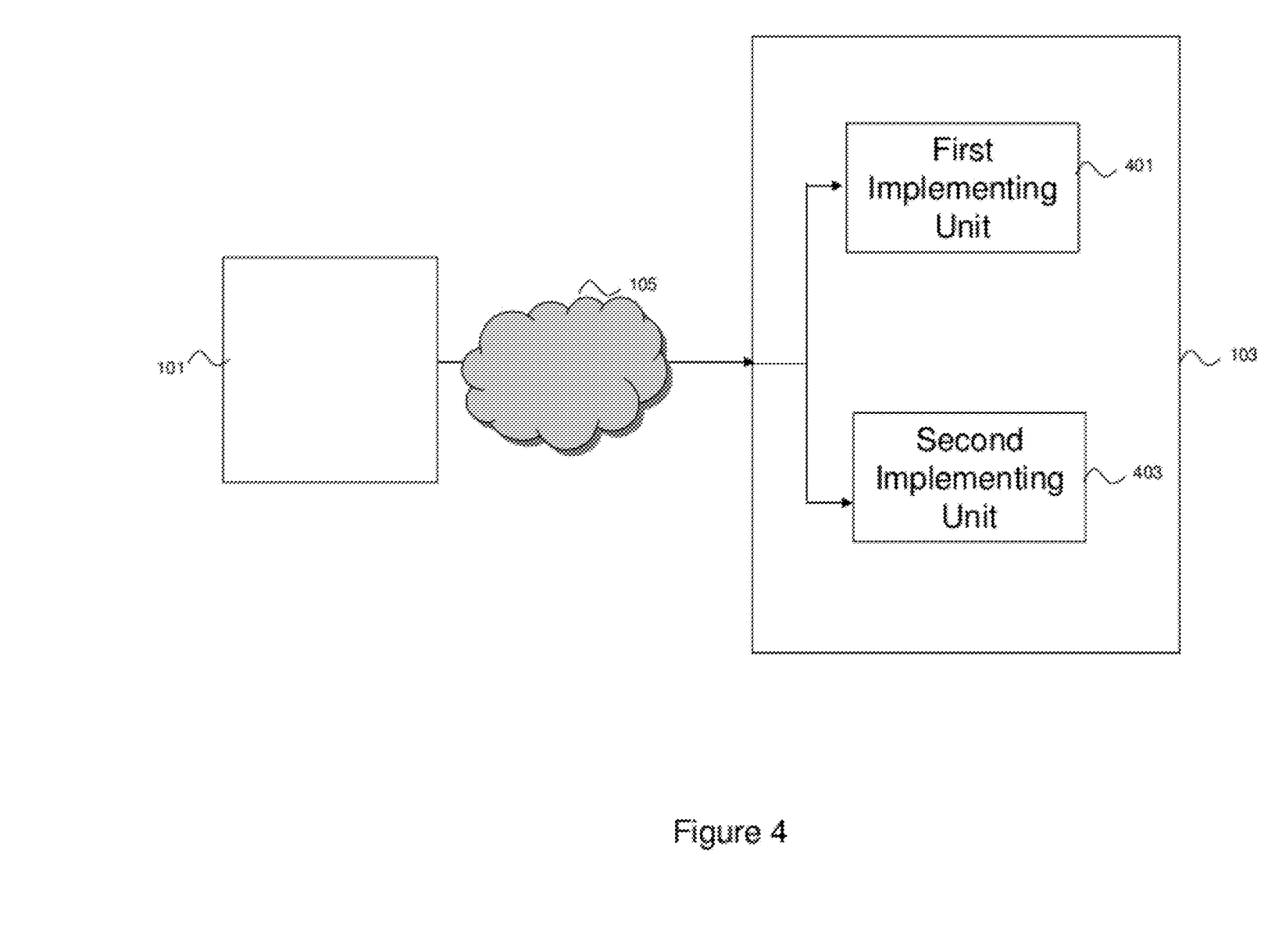
FIG. 4 illustrates a base station comprising a first implementing unit and a second implementing unit in accordance with an embodiment of the present invention.

FIG. 4 illustrates an embodiment of the present invention in which the base station 103 comprises a first implementing unit 401 and a second implementing unit 403. The first implementing unit 401 may be configured to implement the first patch 109 into the base station 103, which has experienced a failure. The second implementing unit 403 may be configured to implement the second patch 111 into the base station 103 if the first patch 109 is successful, the second patch 111 being different from the first patch 109.

Figure 5:
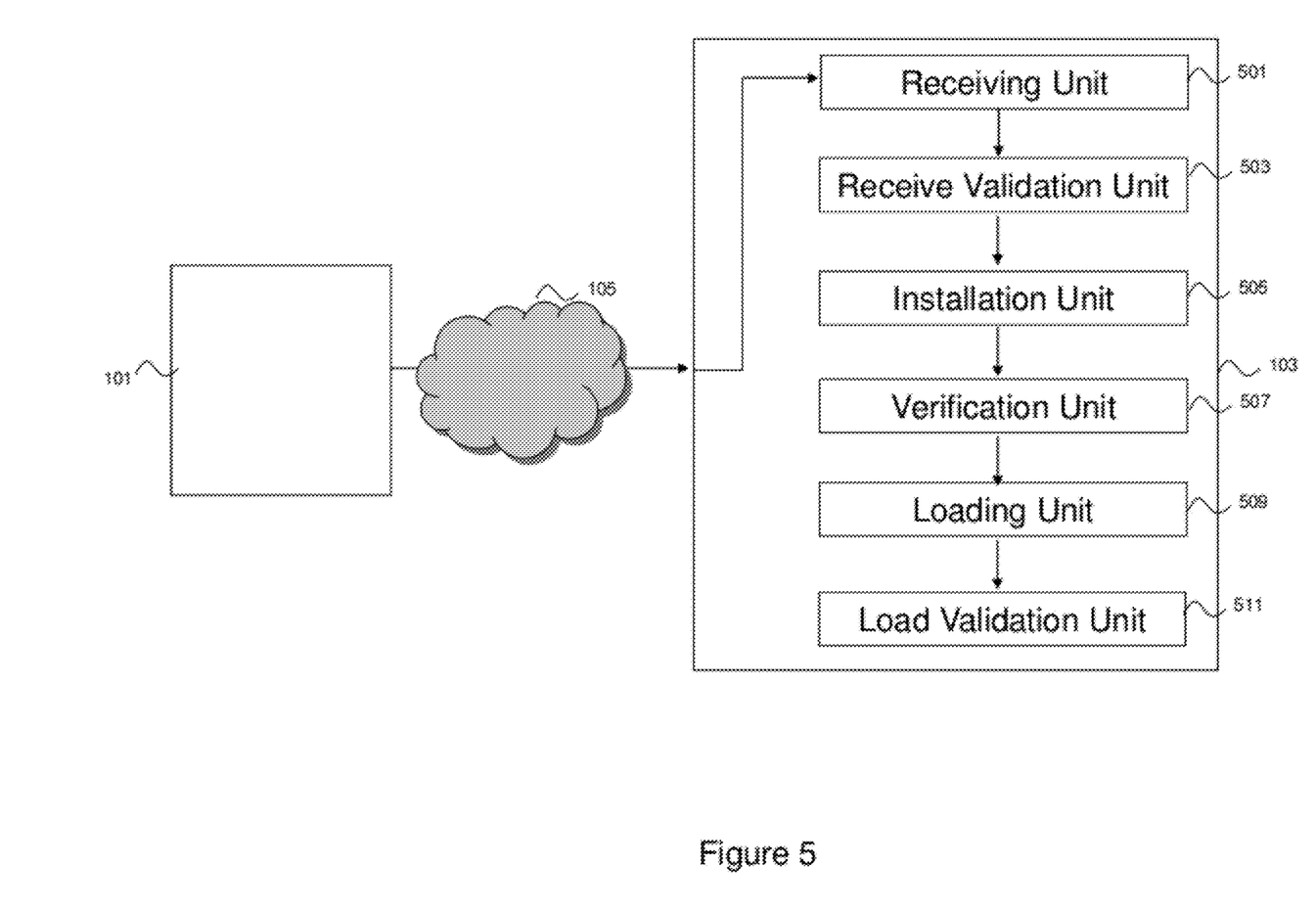
FIG. 5 illustrates a base station comprising a receiving unit, an installation unit, and a loading unit in accordance with an embodiment of the present invention.

FIG. 5 illustrates an embodiment of the present invention in which the base station 103 comprises a receiving unit 501, a receive validation unit 503, an installation unit 505, a verification unit 507, a load unit 509, and a load validation unit 511. The receiving unit 501 may be configured to receive a first download (e.g., the first patch 109) at the base station 103, and the receive validation unit 503 may be configured to validate the first download. The installation unit 505 may be configured to install the first download into the base station 103, and the verification unit 507 may be configured to verify the install of the first download. The loading unit 509 may be configured to load the installed first download into the base station 103, and the load validation unit 511 may be configured to validate the load of the installed first download. The receiving unit 501 if the load validation unit 511 indicates a successful loading, and the installation unit 505 is also configured to install the second download at the base station 103.

Figure 6:
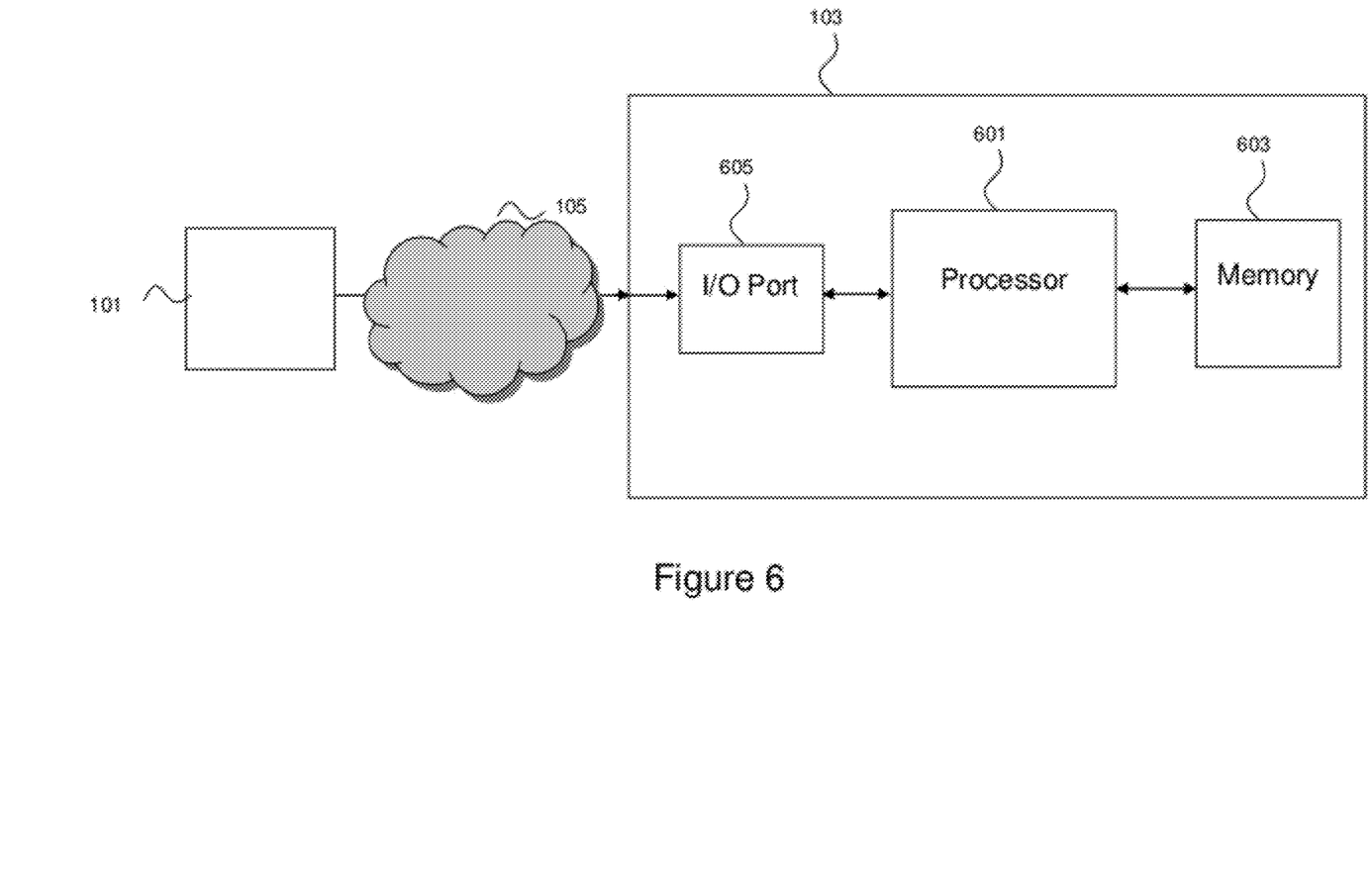
FIG. 6 illustrates a processing system that can be utilized to implement methods in accordance with an embodiment of the present invention.

FIG. 6 illustrates a processing system that can be utilized to implement methods of the present invention. In this case, the main processing for the base station 103 is performed in a processor 601, which can be a microprocessor, digital signal processor or any other appropriate processing device. Program code (e.g., the code implementing the algorithms and components disclosed above) and data can be stored in a memory 603. The memory can be local memory such as DRAM or a non-transitory medium of mass storage such as a hard drive, optical drive or other storage (which may be local or remote). While the memory 603 is illustrated functionally with a single block, it is understood that one or more hardware blocks can be used to implement this function.

In one embodiment, the processor 601 can be used to implement various ones (or all) of the functions discussed above. For example, the processor 601 can serve as a specific functional unit at different times to implement the subtasks involved in performing the techniques of the present invention. Alternatively, different hardware blocks (e.g., the same as or different than the processor) can be used to perform different functions. In other embodiments, some subtasks are performed by the processor while others are performed using a separate circuitry.

FIG. 6 also illustrates an I/O port 605, which can be used to connect to the transmission system 101 and to download the series of patches 107 (see FIG. 1). For example, the I/O port 605 may be linked to the transmission system 101 by the network 105, and may be utilized to receive the series of patches 107 from the network 105.

This incremental remediation process allows for a graceful and automated recovery of a device such as the base station 103 that has failed an integrity validation by replacing corrupted soft components (e.g. software module, firmware, configuration) in a systematic manner wherein corrupted components are replaced one-by-one. After each replacement, the process may be checked and validated before the next component is remediated. By checking the process after each component has been remediated and also at various points within each remediation, unrecoverable events can be detected much earlier than a full remediation of every component simultaneously may catch the unrecoverable event. With such an early detection of an unrecoverable event, additional and valuable resources are not needlessly wasted attempting to remediate the entire base station 103.

Although the present invention and its advantages have been described in detail, it should be understood that various changes, substitutions and alterations can be made herein without departing from the spirit and scope of the invention as defined by the appended claims. For example, the order of downloaded patches may be adjusted as desired in order to maximize the potential for recovery or to address any security concerns. Additionally, the precise methods by which components may be verified or loads be validated may also vary from the specific embodiments described here while remaining within the scope of the embodiments.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for remediating a base station, the method comprising:
   implementing a first patch into the base station that has experienced a failure;
   raising a trust level of the base station after the implementing the first patch; and
   implementing a second patch into the base station when the first patch is successful, the second patch being different from the first patch.

2. The method of claim 1, wherein the implementing the first patch further comprises:
   downloading the first patch;
   validating the first patch after the downloading the first patch; and
   installing the first patch.

3. The method of claim 2, wherein the installing the first patch further comprises generating an installed first patch and wherein the implementing the first patch further comprises loading the installed first patch.

4. The method of claim 2, further comprising updating a stored reference number for a component after the installing the first patch.

5. The method of claim 2, further comprising redownloading the first patch when the validating the first patch indicates a non-successful download.

6. The method of claim 2, wherein the base station is a Femto access point.

7. The method of claim 1, wherein the implementing the first patch and the implementing a second patch are performed automatically.

8. A method of automatically recovering from a failure, the method comprising:
   implementing a first patch in a base station, the implementing the first patch comprising:
      receiving the first patch;
      validating the first patch; and
      installing the first patch into a first component of the base station;
   increasing a trust level of the base station after the implementing the first patch;
   implementing a second patch in the base station after the implementing the first patch in the base station, the implementing the second patch comprising:
      receiving the second patch;
      validating the second patch; and
      installing the second patch into a second component of the base station different from the first component.

9. The method of claim 8, further comprising retrying the receiving the first patch when the validating the first patch indicates a failure to successfully download.

10. The method of claim 8, wherein the implementing the first patch further comprises verifying that the first patch was installed.

11. The method of claim 8, further comprising verifying that the first patch was installed, wherein the installing the first patch is performed a second time when the verifying that the first patch was installed indicates a failure.

12. The method of claim 8, further comprising ranking the first patch and the second patch in accordance with a priority.

13. A method for failure recovery, the method comprising:
   receiving a first download at a wireless base station;
   installing the first download into the wireless base station;
   loading the installed first download into the wireless base station;
   validating the loading the installed first download;
   changing a trust level of the wireless base station when the validating the loading the installed first download indicates a successful loading;
   receiving a second download at the wireless base station when the validating the loading the installed first download indicates a successful loading; and
   installing the second download at the wireless base station.

14. The method of claim 13, further comprising:
   validating the first download after the receiving the first download; and
   retrying the receiving the first download when the validating the first download indicates a failure.

15. The method of claim 13, further comprising:
   verifying the installing the first download; and
   reinstalling the first download when the verifying the installing the first download indicates a failure.

16. The method of claim 13, further comprising updating a reference value of a component after the installing the first download.

17. The method of claim 13, wherein the first download and the second download install different components within the wireless base station.

18. A method of transmitting remediation data, the method comprising:
   transmitting a first patch from a transmission station, the first patch being a first subset of a series of patches that are related to each other;

receiving a request for a second patch to be transmitted at the transmission station;

increasing a trust level based at least in part on the receiving the request for the second patch; and transmitting the second patch from the transmission station, the second patch being a second subset of the series of patches and also being different from the first patch.

19. The method of claim 18, wherein the first patch comprises remediation data for a first component and the second patch comprises remediation data for a second component different from the first component.

20. The method of claim 18, wherein the transmission station is an operations, administration, and maintenance system.

21. The method of claim 18, wherein the first subset comprises two or more patches.

22. A base station comprising:

a processor with a first implementing unit, the first implementing unit configured to implement a first patch into the base station that has experienced a failure, wherein the processor is also configured to receive an updated trust level after the implanting the first patch; and a second implementing unit, the second implementing unit configured to implement a second patch into the base station when the first patch is successful, the second patch being different from the first patch.

23. The base station of claim 22, wherein the first implementing unit further comprises:

a downloading unit, the downloading unit configured to download the first patch;

a download validation unit, the download validation unit configured to validate the first patch; and an installation unit, the installation unit configured to install the first patch.

24. The base station of claim 23, wherein the base station is a Femto access point.

25. A base station comprising:

a receiving unit configured to receive a first download at a base station;

an installation unit configured to install the first download into the base station;

a loading unit configured to load the installed first download into the base station; and a load validation unit configured to validate the load of the installed first download;

wherein the receiving unit is also configured to receive a change in an assigned trust level after load validation unit has validated the load the of the installed first download, wherein the receiving unit is also configure to receive a second download at the base station when the load validation unit indicates a successful loading, and wherein the installation unit is also configured to install the second download at the base station.

26. The base station of claim 25, further comprising a receive validation unit configured to validate the first download.

27. The base station of claim 25, further comprising a verification unit configured to verify the install of the first download.

* * * * *